United States Patent [19]

Sandusky et al.

[11] Patent Number: 5,266,088

[45] Date of Patent: Nov. 30, 1993

[54] WATER-BASED POLISH

[75] Inventors: James S. Sandusky, Parma, Ohio; Mohammad Nilchian, Woodland Hills, Calif.

[73] Assignee: NicSand, Brooklyn Hts., Ohio

[21] Appl. No.: 949,582

[22] Filed: Sep. 23, 1992

[51] Int. Cl.$^5$ .............................................. C09K 3/14
[52] U.S. Cl. ...................................... 51/298; 51/293; 51/303; 51/304; 51/309; 106/8
[58] Field of Search ................. 51/293, 298, 303, 304, 51/309; 106/8

[56]  References Cited

U.S. PATENT DOCUMENTS

| | | | |
|---|---|---|---|
| 4,138,228 | 2/1979 | Hartfelt et al. | 51/295 |
| 4,218,250 | 8/1980 | Kasprzak | 106/3 |
| 4,242,842 | 1/1981 | Yancey | 51/298 |
| 4,581,042 | 4/1986 | Willmore | 51/293 |
| 4,755,223 | 7/1988 | Castaldo | 106/3 |
| 4,859,359 | 8/1989 | DeMatteo et al. | 106/3 |
| 4,898,614 | 2/1990 | Halloran et al. | 106/3 |
| 4,935,039 | 6/1990 | Miyazaki et al. | 51/293 |
| 4,952,240 | 8/1990 | Smith | 51/304 |
| 5,017,222 | 5/1991 | Cifuentes et al. | 106/3 |
| 5,154,759 | 10/1992 | Cifuentes et al. | 106/3 |

Primary Examiner—Mark L. Bell
Assistant Examiner—Willie J. Thompson
Attorney, Agent, or Firm—Renner, Otto, Boisselle & Sklar

[57] ABSTRACT

This invention relates to a composition comprising: water; particulate abrasive dispersed in said water, said abrasive having a Knoop scale hardness of at least about 1000 and an average particle size of from about 1 micron up to a U.S. Sieve Series Number of about 50; and an effective amount of at least one thickener to maintain a stable dispersion of said abrasive in said water. The inventive composition can contain one or more surfactants and/or one or more chelating agents. In one embodiment the invention provides for a water-based polish that can be used on any nonporous surface (e.g., glass, plastic, metal, painted surfaces, waxed surfaces, marble, ceramic, soft-precious and semi-precious stones, semi-conductor materials, metallurgical and geological specimens, Formica, etc.). In a particularly advantageous embodiment the electrical conductivity of the inventive water-based polish is sufficiently reduced to the point where it can be applied using an electrically powered applicator without risk of injury to the user due to electrical shock.

25 Claims, No Drawings

WATER-BASED POLISH

TECHNICAL FIELD

This invention relates to water-based polishes and, more particularly, to water-based polishes comprising water, particulate abrasive dispersed in said water, said abrasive having a Knoop scale hardness of at least about 1000 and an average particle size of about 1 micron up to a U.S. Sieve Series Number of about 50 (about 297 microns) and an effective amount of at least one thickener to maintain a stable dispersion of said abrasive in said water. These polishes are useful for polishing nonporous surfaces.

BACKGROUND OF THE INVENTION

Polishes are used to produce or restore a glossy finish on various surfaces as well as prolong the useful lives of those surfaces. The appearance enhancement provided by polishes generally results from the presence in the polish of components that leave a glossy coating, and/or materials that smooth and clean surfaces. Floor, furniture, and shoe polishes rely on the deposition of a film. Applications of car-polish formulae leave glossy and protective films and contain abrasives to remove weathered paint and soils. Metal polishes are based on either abrasive smoothing and cleaning or tarnish-removing chemicals, and they sometimes deposit materials that retard future tarnishing.

Aqueous self-polishing, polymeric floor polishes contain two or three polymeric film formers, coalescents, leveling aids, plasticizers, zinc complexes, ammonia, and wetting and emulsifying agents. An aqueous formula may contain 0-12 weight percent polymer, 0-12 weight percent resin, 0-6 weight percent wax, 0.3-1.5 weight percent tri(butoxyethyl)phosphate, 1-6 weight percent glycol ether, 0-1 weight percent zinc with the remainder being water.

Much of the automobile-polish market is represented by one-step products. One-step products generally contain four functional ingredients: abrasives, straight- and branched-chain aliphatic hydrocarbons, waxes, and silicones. A representative liquid emulsion product might contain 10-15 weight percent abrasive, 10-30 weight percent solvent, 2-12 weight percent silicone, and 0-4 weight percent wax; an emulsion paste product might contain 3-15 weight percent wax and similar amounts of other ingredients.

Formulated metal polishes consist of fine abrasives similar to those involved in industrial buffing operations, i.e., pumice and tripoli. Other ingredients include surfactants, chelating agents and solvents.

Many modern polishes contain inhibitors to prevent oxidation and tarnishing. Metal polishes may contain emulsifiers and thickeners for control of consistency and stabilization of abrasive suspension, and the product form can be solid, paste, or liquid. A representative liquid emulsion product may contain 8-25 weight percent abrasive, 2-6 weight percent surfactant, 0-5 weight percent chelating agents, 0-25 weight percent solvent, and the remainder water. The abrasive content in an emulsion paste product is typically greater than in a solvent product.

U.S. Pat. No. 4,138,228 discloses an article for polishing comprising a polymeric matrix having adhered thereto a polishing abrasive of average particle size less than 10 microns. The polishing abrasives that are disclosed as being useful are rare earth oxides and metallic oxides and the reference specifically identifies cerium oxide, zirconium oxide, alumina, ferric oxide (rough), tin oxide, colloidal silica, chromium oxide, jewelers rouge, pumice and quartz flour. The reference indicates that the article is useful in polishing glass, plastic, metal, ceramic and semiconductor materials, metallurgical and geological specimens, quartz, semiprecious stones and piezo-electric crystals.

It would be advantageous to provide a water-based polish that could be used on any nonporous surface (e.g., glass, plastic, metal, painted surfaces, waxed surfaces, marble, ceramic, soft-precious and semiprecious stones, semi-conductor materials, metallurgical and geological speciments, quartz, etc.). It would be particularly advantageous if the electrical conductivity of this water-based polish was sufficiently reduced to the point where it could be applied using an electrically powered applicator without risk of injury to the user due to electrical shock.

SUMMARY OF THE INVENTION

This invention relates to a composition comprising: water; particulate abrasive dispersed in said water, said abrasive having a Knoop scale hardness of at least about 1000 and an average particle size of from about 1 micron up to a U.S. Sieve Series Number of about 50; and an effective amount of at least one thickener to maintain a stable dispersion of said abrasive in said water. The inventive composition can contain one or more surfactants and/or one or more chelating agents. In one embodiment the invention provides for a water-based polish that can be used on any nonporous surface (e.g., glass, plastic, metal, painted surfaces, waxed surfaces, marble, ceramic, soft-precious and semi-precious stones, semi-conductor materials, metallurgical and geological specimens, Formica, etc.). In a particularly advantageous embodiment the electrical conductivity of the inventive water-based polish is sufficiently reduced to the point where it can be applied using an electrically powered applicator without risk of injury to the user due to electrical shock.

DESCRIPTION OF THE PREFERRED EMBODIMENTS

The water-based inventive compositions preferably contain from about 1% to about 3% by weight, more preferably about 1.2% to about 2.5% by weight, more preferably about 1.4% to about 1.9% by weight, more preferably about 1.6% to about 1.7% by weight of at least one thickener; and from about 3% to about 15% by weight, more preferably from 5% to about 13% by weight of particulate abrasive. In one embodiment the particulate abrasive is present at a level of about 3% to about 9% by weight, preferably about 5% to about 7% by weight, and in a preferred embodiment at a level of about 6% by weight. In one embodiment the particulate abrasive is present at a level of about 9% to about 15% by weight, preferably about 11% to about 13% by weight, and in a preferred embodiment at a level of about 12% by weight. In one embodiment the pH of these compositions is preferably in the range of about 6.5 to about 8.5, more preferably about 7 to about 8, more preferably about 7 to about 7.5.

The thickener can be any organic or inorganic thickener suitable for providing a stable dispersion of the particulate abrasive in the inventive water-based composition. The term "stable dispersion" is used herein to refer to a dispersion of the particulate abrasive in water that remains sufficiently dispersed after storage for 100 hours at room temperature such that no particulate solids have collected at the bottom of the container or any solids that have collected are re-dispersed with only mild agitation (e.g., hand-shaking a 24-ounce size container filled with the inventive composition.) Depending on the desired end use, the inventive composition is in the form of liquid, paste or solid, with the liquids being especially preferred. Generally, these thickeners can be polysaccharides, synthetic thickening polymers, or mixtures of two or more of these. Among the polysaccharides that are useful are natural gums such as those disclosed in "Industrial Gums" by Whistler and B. Miller, published by Academic Press, 1959. Disclosures in this book relating to water-soluble thickening natural gums is hereby incorporated by reference. Specific examples of such gums are gum agar, guar gum, gum arabic, algin, dextrans, xanthan gum, tragacanth gum, carrageenan, locust been gum, and the like. Also among the polysaccharides that are useful as thickeners for the water-based compositions of this invention are cellulose ethers and esters, including hydroxy hydrocarbyl cellulose and hydrocarbylhydroxy cellulose and its salts. Specific examples of such thickeners are hydroxyethyl cellulose, carboxyethyl cellulose, hydroxypropyl cellulose and hydroxypropyl methyl cellulose. Mixtures of two or more of any such thickeners are also useful.

The thickeners can also be synthetic thickening polymers. Many such polymers are known to those of skill in the art. Representative of these thickeners are polyacrylates and polyacrylamides. Other useful thickeners are known to those of skill in the art and many can be found in the list in "McCutcheon's Volume 2: Functional Materials", 1992, North American Edition, pp. 262–280, published by McCutcheon Division, MC Publishing Co., Glen Rock, N.J., USA. The disclosures therein, relative to water-soluble polymeric thickening agents meeting the general requirements set forth above are hereby incorporated by reference.

The thickener can be an inorganic thickener such as fused silica.

In one embodiment the thickener is a hygroscopic polymeric material. The hygroscopic polymeric material can be any polymeric material capable of absorbing at least about 100 times its weight in water, preferably at least about 250, more preferably at least about 400 times its weight in water, and in one embodiment about 500 times its weight in water.

In one embodiment the thickener prior to being admixed with the water, is in granular form with an average particle size in the range of about 40 to about 150 microns, more preferably about 80 to about 150 microns.

In one embodiment the specific gravity of thickener is in the range of about 0.6 to about 1, more preferably about 0.7 to about 0.9, and in one embodiment about 0.8.

An example of a useful thickener is available under the name WATERWORKS (a product of WaterWorks America, Inc., of North Royalton, Ohio, identified variously as a polyacrylamide, an acrylic anionic polymer, an acyclic amide copolymer or as 2-propanoic acid acrylamide acrylate) which has a specific gravity of 0.8. This polymeric material is preferably ground to an average particle size in the range of about 80 to about 150 microns prior to being added to the inventive composition. This polymeric material absorbs about 500 times its weight in water.

Another example of a useful thickener is available under the name Methocel J12MS which is a product of Dow Chemical identified as hydroxypropyl methylcellulose. An advantage of using this material as the thickener is that it also functions as a soil absorbent. This property makes this material particularly suitable for use with floor polishes.

The abrasives that are useful are characterized by a Knoop scale hardness of at least about 1000, preferably at least about 1500, more preferably at least about 2000. The average particle size of these abrasives is preferably from about 1 micron up to a U.S. Sieve Series Number of about 50 (about 297 microns). That is, with respect to the foregoing upper limit of particle size the particulate abrasive will pass through a No. 50 U.S. Sieve Series screen. The particulate size of the abrasive can be from about 1 micron up to a Sieve Number of about 100 (about 149 microns), preferably from about 1 micron up to a Sieve Number of about 200 (about 74 microns), more preferably from about 1 micron up to a Sieve Number of about 325 (about 44 microns), more preferably from about 1 to about 40 microns, more preferably from about 1 to about 20 microns. In a particularly advantageous embodiment of the invention the particulate size of the abrasive is from about 1 to about 10 microns, more preferably from about 1 to about 8 microns, more preferably from 1 to about 5 microns, more preferably from about 1 to about 3 microns, and in an especially preferred embodiment from about 1.2 to about 2.2 microns. Examples of the abrasive materials include:

| Abrasive | Knoop Scale Hardness* |
| --- | --- |
| Topaz | 1190 |
| Aluminum oxide (Corundum) | 2050 |
| Silicon carbide | 2480 |
| Boron nitride (Borazon | 4700 |
| Diamond | 8200 |

*Knoop scale hardness numbers at a 100 gm-load (K-100) average, kgf/mm².

In one embodiment the abrasive is aluminum oxide having a Knoop scale hardness number of at least about 1500, preferably at least about 2000, and an average particle size of up to about 40 microns, preferably up to about 20 microns, more preferably up to about 10 microns. In a particularly advantageous embodiment the aluminum oxide abrasive has an average particle size in the range of about 1 to about 8, preferably about 1 to about 5, more preferably about 1 to about 3, more preferably about 1.2 to about 2.2 microns. In one embodiment Mirox-AL (a product of Bernatex Corporation, a.k.a. Bonded Oxides Corporation, having a place of business at 63 Middlesex Street, P.O. Box 905, North Chelmsford, Mass. 01863, identified as aluminum oxide particulate abrasive having an average particle size of 1.2 to 2.2 microns) is useful as the abrasive.

In one embodiment the inventive composition contains at least one surfactant. These surfactants can be of the cationic, anionic, nonionic or amphoteric type. Many such surfactants of each type are known to the art. See, for example, McCutcheon's "Emulsifiers & Detergents", 1992, North American Edition, pp. 1–209, published by McCutcheon Division, MC Publishing Co., Glen Rock, N.J., U.S.A., these pages being incorporated herein by reference.

Among the nonionic surfactant types are the alkylene oxide-treated products, such as ethylene oxide-treated phenols, alcohols, esters, amines and amides. Ethylene oxide/propylene oxide block copolymers are also useful nonionic surfactants. Glycerol esters and sugar esters are also known to be nonionic surfactants. Many other suitable nonionic surfactants are known; see, for example, the aforementioned McCutcheon's as well as the treatise "Ionic Surfactants" edited by Martin J. Schick, M. Dekker Co., N.Y., 1967, which is incorporated herein by reference for its disclosures in this regard.

As noted above, cationic, anionic and amphoteric surfactants can also be used. Generally, these are all hydrophilic surfactants. Anionic surfactants contain negatively charged polar groups while cationic surfactants contain positively charged polar groups. Amphoteric surfactants contain both types of polar groups in the same molecule. A general survey of useful surfactants is found in the Encyclopedia of Chemical Technology under the heading "Surfactants and Detersive System," Third Edition, Kirk-Othmer, Volume 22, pp. 332–432 (1983) John Wiley and Son, New York, and the aforementioned compilation published under the name of McCutcheon's. These references are both incorporated herein by reference.

Among the useful anionic surfactant types are the widely known carboxylate soaps, organo sulfates, sulfonates, sulfocarboxylic acids and their salts, and phosphates. Useful cationic surfactants include nitrogen compounds such as amine oxides and the well-known quaternary ammonium salts. Amphoteric surfactants include amino acid-type materials and similar types. Various cationic, anionic and amphoteric surfactants are available from the industry, particularly from such companies as Rohm & Haas and Union Carbide Corporation, both of America. Further information about anionic and cationic surfactants also can be found in the texts "Anionic Surfactants," Parts II and III, edited by W. M. Linfield, published by Marcel Dekker, Inc., New York, 1976 and "Cationic Surfactants," edited by E. Jungermann, Marcel Dekker, Inc., New York, 1976. Both of these references are incorporated by reference for their disclosures in this regard.

In one embodiment the surfactant is Amphoterge W-2 which is a product of Lonza identified as cocoamphocarboxyglycinate. The supplier indicates that this material is an amphoteric surfactant.

In one embodiment the surfactant is the reaction product (e.g., amide, imide, salt, mixtures thereof, etc.) of at least one fatty acid with at least one hydroxy amine. The fatty acids are derived from or contained in animal or vegetable fat or oil. (Liquid fats are often referred to as oils.) They are composed of a hydrocarbon chain of 1 to about 30 carbon atoms, preferably about 4 to about 26 carbon atoms, more preferably about 12 to about 22 carbon atoms, and are characterized by a terminal —COOH group. They may be saturated or unsaturated, and are typically solids, semisolids or liquids. Examples of the saturated fatty acids include butyric, lauric, octanoic, palmitic, myristic, stearic, isostearic, and behenic. Examples of unsaturated acids include oleic, linoleic and linolenic. Sources of these fatty acids include beef tallow, butter, coconut oil, corn oil, cottonseed oil, lard, olive oil, palm oil, palm kernel, peanut oil, soybean oil, cod liver oil, linseed oil, tung oil, fish oil, tall oil and rosin.

In one embodiment component the fatty acid is at least one mono-, di or triglyceride represented by the formula

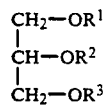

wherein $R^1$, $R^2$ and $R^3$ are independently hydrogen or acyl groups represented by the formula

wherein $R^4$ is a hydrocarbyl group of about 1 to about 30 carbon atoms, with the proviso that at least one of $R^1$, $R^2$ or $R^3$ is said acyl group. $R^4$ preferably has about 3 to about 30 carbon atoms, more preferably about 8 to about 30 carbon atoms, more preferably about 8 to about 26 carbon atoms, more preferably about 12 to about 20 carbon atoms. $R^4$ is preferably a straight chain hydrocarbon that can be saturated or unsaturated. The unsaturated groups can contain one or more double bonds. Representative

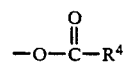

moieties include lauryl, myristyl, palmityl, stearyl, arachidyl, palmitoleyl and oleyl.

These glycerides are esters that occur naturally in animal and vegetable fats and oils. Examples of such fats and oils include corn oil, coconut oil, soybean oil, cottonseed oil, palm oil, tallow, bacon grease, butter, castor oil, tall oil and rosin. Examples of useful glycerides include glycerol 1,3-distearate, glycerol monolaurate, glycerol monooleate, glycerol monoricinoleate, glycerol monostearate, glycerol tributyrate, glycerol tripropionate, glycerol tristearate, glycerol trioleate, glyceryl tripalmitate, and glyceryl triricinoleate.

The hydroxyamines can be either mono- or polyamines, provided they contain at least one primary or secondary amino group. The hydroxy-substituted amines are typically those having hydroxy substituents bonded directly to a carbon atom other than a carbonyl carbon atom. Examples of such hydroxy-substituted amines include ethanolamine, di(3-hydroxypropyl)-amine, 3-hydroxybutylamine, 4-hydroxybutylamine, diethanolamine, di(2-hydroxypropyl)amine, N-hydroxypropyl propylamine, N-(2-hydroxyethyl)-cyclohexylamine, 3-hydroxycyclopentylamine, parahydroxyaniline, N-hydroxyethyl piperazine, and the like.

Typically, the hydroxyamines are primary or secondary alkanol amines or mixtures thereof. Such amines can be represented, respectfully, by the formulae:

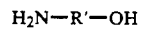

and

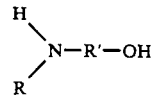

wherein each R is independently a hydrocarbyl group of one to about eight carbon atoms or hydroxyl-substituted hydrocarbyl group of two to about eight carbon atoms and R' is a divalent hydrocarbyl group of about two to about 18 carbon atoms. The group —R'—OH in such formulae represents the hydroxyl-substituted hydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc., group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is a lower alkyl group of up to about 7 carbon atoms.

The hydroxyamines can also be ether N-(hydroxy-substituted hydrocarbyl)amines. These are hydroxyl-substituted poly(hydrocarbyloxy) analogs of the above-described hydroxy amines (these analogs also include hydroxyl-substituted oxyalkylene analogs). Such N-(hydroxy-substituted hydrocarbyl) amines can be conveniently prepared by reaction of epoxides with afore-described amines and can be represented by the formulae:

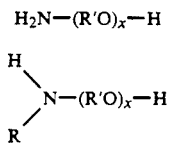

wherein x is a number from about 2 to about 15 and R and R' are as described above.

Polyamine analogs of these hydroxy amines, including alkoxylated alkylene polyamines (e.g., N,N-(diethanol)-ethylene diamine) can also be used. Such polyamines can be made by reacting alkylene amines (e.g., ethylenediamine) with one or more alkylene oxides (e.g., ethylene oxide, octadecene oxide) of 2 to about 20 carbons. Similar alkylene oxide-alkanol amine reaction products can also be used such as the products made by reacting the afore-described primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl) ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid mono- or polyamines are also useful.

Examples of the N-(hydroxyl-substituted hydrocarbyl) amines include mono-, di-, and triethanolamine, dimethylethanolamine, diethylethanolamine, di-(3-hydroxylpropyl) amine, N-(3-hydroxylbutyl) amine, N-(4-hydroxylbutyl) amine, N,N-di-(2-hydroxylpropyl) amine, N-(2-hydroxylethyl) morpholine and its thio analog, N-(2-hydroxylethyl) cyclohexylamine, N-3-hydroxyl cyclopentylamine, o-, m- and p-aminophenol, N-(hydroxylethyl) piperazine, N,N'-di(hydroxylethyl) piperazine, and the like.

Hydroxyalkyl alkylene polyamines having one or more hydroxyalkyl substitutents on the nitrogen atoms, are also useful. Useful hydroxyalkyl-substituted alkylene polyamines include those in which the hydroxyalkyl group is a lower hydroxyalkyl group, i.e., having less than eight carbon atoms. Examples of such hydroxyalkyl-substituted polyamines include N-(2-hydroxyethyl) ethylene diamine, N,N-bis(2-hydroxyethyl) ethylene diamine, 1-(2-hydroxyethyl)-piperazine, monohydroxypropyl-substituted diethylene triamine, dihydroxypropyl-substituted tetraethylene pentamine, N-(3-hydroxybutyl) tetramethylene diamine, etc. Higher homologs as are obtained by condensation of the above-illustrated hydroxy alkylene polyamines through amino groups or through hydroxy groups are likewise useful. Condensation through amino groups results in a higher amine accompanied by removal of ammonia and condensation through the hydroxy groups results in products containing ether linkages accompanied by removal of water.

To prepare the fatty acid/hydroxyamine reaction product, the fatty acid and the hydroxyamine are mixed together and heated, optionally in the presence of a normally liquid, substantially inert organic liquid solvent/diluent, at temperatures of about 20° C. up to the decomposition temperature of the reaction component and/or product having the lowest such temperature. This temperature can be in the range of about 30° C. to about 300° C. The fatty acid and the hydroxyamine are preferably reacted in amounts sufficient to provide from about 0.1 to about 3, preferably about 0.5 to about 2 moles of hydroxyamine per mole of fatty acid.

The following example is provided to illustrate the preparation of a fatty acid-hydroxyamine reaction product that is useful as a surfactant with the inventive composition.

EXAMPLE S-1

260 grams of Pamak W4 (a product of Hercules identified as a tall oil fatty acid) are mixed with 740 grams of Amide-C (a product of Norman Fox identified as a cocoamido diethanolamine) at ambient temperature (about 20° C.) and atmospheric pressure for one hour to provide the desired product.

The above-discussed surfactants, when used, are generally employed in effective amounts to aid in the dispersal of the various additives, particularly the particulate abrasives discussed above, in the water-based compositions of the invention. Mixtures of two or more of these surfactants can be used. The inventive composition can contain up to about 20% by weight, more preferably up to about 15% by weight of one or more of these surfactants.

In one embodiment the inventive compositions contain at least one chelating agent. The chelating agents that are useful include sodium tripolyphosphate and sodium ethylene diamine tetraacetic acid. These are typically employed in the inventive compositions at levels of up to about 1% by weight, preferably up to about 0.5% by weight, more preferably up to about 0.2% by weight, and in one embodiment at a level of about 0.1% by weight.

In one embodiment the inventive composition is made by first dispersing the particulate abrasive in water. This is preferably done using a mixing tank equipped with an agitator capable of forming a vortex. After the abrasive is dispersed, the thickener is then added to the mixture. During the addition of the thickener mixing is continued at a sufficient level to maintain the dispersion of the abrasive in water. The thickener is preferably added at a sufficient rate to provide an even dispersion of it in the abrasive-water mixture. In one embodiment the thickener is sifted through a screen as it is added to the abrasive-water mixture. After the addition of the thickener is completed, mixing is continued for a short time (e.g., up to about 20 minutes) to insure a homogeneous mixture of abrasive and thickener. One or more of the above-discussed surfactants can be added at any stage in the mixing process.

In one embodiment the inventive composition is made by first dispersing the thickener in water with stirring. While continuing the stirring, one or more of the above-discussed surfactants are added. The particulate abrasive is then added slowly with continued stirring until a uniform dispersion is achieved.

The following examples are provided to illustrate the preparation of preferred embodiments of the inventive composition.

EXAMPLE 1

86.35 gallons of water are placed in a 100-gallon stainless steel mixing tank equipped with an agitator capable of forming a vortex. The agitator is activated and a vortex is formed. 100 pounds of Mirox-AL (aluminum oxide having an average particle size in the range of 1.2 to 2.2 microns) are added to the water while continuing to maintain the vortex. 13.76 pounds of WATER-WORKS polymer, which is previously ground to an average particle size in the range of about 80 to about 150 microns, is added to the mixture of water and abrasive while continuing to maintain the vortex. Mixing is continued until a gel is formed or until the water is fully absorbed into the polymer. Mixing is then continued for an additional 5 minutes to provide the desired product. The product has a pH of 7.29. This formulation is useful for polishing any nonporous surface.

EXAMPLE 2

The following formulation is prepared:

| | % Wt. |
|---|---|
| Water (soft or deionized) | 82.323 |
| Methocel J12MS (product of Dow Chemical identified as a hydroxypropyl methylcellulose) | 1.678 |
| Amphoteric W-2 (product of Lonza identified as cocoamphocarboxyglycinate) | 4.003 |
| Product of Example S-1 | 5.998 |
| Mirox-AL (aluminum oxide abrasive having an average particle size of 1.2 to 2.2 microns) | 5.998 |

This formulation is prepared by dispersing the Methocel J12MS in the water while using high speed agitation to disperse the Methocel J12MS. Mixing is continued until the Methocel J12MS is dissolved. The Amphoteric W-2 and the CDM are added with continued mixing. The Mirox-AL is added slowly to the resulting mixture with continued mixing until a uniform dispersion is obtained. This formulation is particularly suitable for polishing waxed floors and marble floors.

The nonporous surfaces that can be polished using the water-based compositions of the invention can be any nonporous surface or any surface having pores that do not fill with the abrasive used in the inventive composition. Examples include glass, metal, plastic, ceramic, soft-precious and semiprecious stones, Formica, semiconductor materials, metallurgical and geological specimens, quartz, marble, painted surfaces (e.g., wood, metal, plastic), waxed surfaces (e.g., waxed linoleum, marble or clay tile floors), etc. Examples include: glass or plastic (e.g., Plexiglass) windows, windshields and mirrors; painted or anodized aluminum surfaces; plastic or metal automobile body parts (e.g., body panels); painted fiberglass reinforced thermoset polymeric surfaces (e.g., boats, automobile body parts); aluminum wheels and hubcaps; plastic tail lights; chrome surfaces (e.g., chrome bumpers and exhausts); plastic helmets (e.g., motorcycle, baseball, football) and plastic face shields; eyewear (e.g., nonprescription glasses (plastic or glass lenses), goggles); golf clubs; skies (e.g., snow, water); bowling balls; surfboards; television or computer screens; brass, chrome or copper plumbing fixtures; plastic or metal light fixtures; brass hardware and brass beds; ceramic countertops and floors; smooth stove tops and countertops; porcelain enamel and stainless steel sinks; porcelain enamel and plastic (e.g., fiberglass reinforced) bath tubs, hot tubs and shower stalls; Formica surfaces (e.g., countertops); marble surface; (e.g., floors, countertops); jewelry (e.g., gold or silver rings, watch crystals, watch bands); etc.

The inventive composition is used by applying it to the nonporous surface, rubbing the surface with the composition until scratches in the surface are removed or reduced to the desired level, and removing the composition from the surface. The inventive composition is preferably in liquid form and as such can be applied to the surface being treated simply by pouring a desired amount on the surface. Alternatively, the inventive composition can be applied to an applicator which is then used to rub the surface. In one embodiment the nonporous surface is polished to the extent that no scratches are visible at a magnification of 10X. In one embodiment the electrical conductivity of the inventive composition is sufficiently low to permit the use of an electrically powered applicator (e.g., buffer) to rub the surface with the inventive composition without risk of injury to the user due to electrical shock. The composition can then be removed from the surface using standard techniques (e.g., water-rinsing, wiping, sweeping, vacuuming, etc.).

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A composition comprising:
   water;
   particulate abrasive dispersed in said water, said abrasive having a Knoop scale hardness of at least about 1,000 and an average particle size of from about 1 micron up to a U.S. Sieve Series Number of about 50;
   at least one thickener; and
   at least two surfactants; one of said surfactants being an amphoteric surfactant; and the other of said surfactants being an amide, imide or salt made by reaction of at least one fatty acid with at least one hydroxy amine;

the pH of said composition being in the range of about 6.5 to about 8.5.

2. The composition of claim 1 wherein said composition further comprises a minor property-improving amount of at least one chelating agent.

3. The composition of claim 1 wherein said thickener is an organic or an inorganic thickener.

4. The composition of claim 1 wherein said thickener is a polysaccharide, polyacrylate or a polyacrylamide.

5. The composition of claim 1 wherein said thickener is a hygroscopic polymeric material capable of absorbing or attracting at least about 100 times it weight in water.

6. The composition of claim 1 wherein said thickener is a polyacrylamide capable of absorbing or attracting at least about 400 times its weight in water; prior to being intermixed with said water, said polyacrylamide being in granular form having an average particle size in the range of about 40 to about 150 microns.

7. The composition of claim 1 wherein said thickener is a hydroxy hydrocarbyl cellulose.

8. The composition of claim 1 wherein said abrasive is a mineral selected from the group consisting of topaz, aluminum oxide, silicon carbide, boron nitride and diamond.

9. The composition of claim 1 wherein said abrasive has an average particle size of about 1 to about 10 microns.

10. The composition of claim 1 wherein said abrasive has a Knoop scale hardness of at least about 2000.

11. The composition of claim 1 wherein said abrasive is aluminum oxide with a Knoop scale hardness of at least about 1500 and an average particle size in the range of about 1.2 to about 2.2 microns.

12. A composition comprising:
water;
at least one hygroscopic polymeric material intermixed with said water, said polymeric material being a polyacrylamide and being capable of absorbing or attracting at least about 400 times its weight in water; and prior to being intermixed with said water, said polymeric material being in granular form having an average particle size in the range of about 40 to about 150 microns; and
aluminum oxide particulates dispersed throughout the mixture of said polymeric material and water, said aluminum oxide having a Knoop scale hardness of at least about 1500, said aluminum oxide particulates having an average size in the range of about 1.2 to about 2.2 microns;
the pH of said composition being in the range of about 6.5 to about 8.5.

13. A composition comprising:
water;
at least one cellulose thickener;
aluminum oxide particulates dispersed throughout the mixture of said thickner and water, said aluminum oxide having a Knoop scale hardness of at least about 1500, said aluminum oxide particulates having an average size in the range of about 1.2 to about 2.2 microns; and
at least two surfactants, one of said surfactants being an amphoteric surfactant and the other of said surfactants being an amide, imide or salt made by the reaction of at least one fatty acid with at least one hydroxy amine.

14. A process for removing scratches from a nonporous surface comprising:
applying the composition of claim 1 to said surface;
rubbing said surface with said composition until said scratches are removed or reduced to the desired degree; and
removing said composition from said surface.

15. A process for making a water-based polish comprising:
dispersing a particulate abrasive in water to form an intermediate dispersion; said abrasive having a Knoop scale hardness of at least about 1000 and an average particle size of from about 1 micron up to a U.S. Sieve Series Number of about 50;
dispersing into said intermediate dispersion at least one hygroscopic polyacrylamide capable of absorbing at least about 100 times its weight in water;
the pH of said polish being in the range of about 6.5 to about 8.5.

16. A process for making a water-based polish comprising:
dispersing at least one thickener in water to form a first intermediate product;
dispersing at least two surfactants into said first intermediate product to form a second intermediate product; one of said surfactants being an amphoteric surfactant; and the other of said surfactants being an amide, imide or salt made by the reaction of at least one fatty acid with at least one hydroxy amine; and
dispersing particulate abrasive into said second intermediate product, said abrasive having a Knoop scale hardness of at least about 1000 and an average particle size of from about 1 micron up to a U.S. Sieve Series Number of about 50;
the pH of said polish being in the range of about 6.5 to about 8.5.

17. A composition comprising:
water;
particulate abrasive dispersed in said water, said abrasive having a Knoop scale hardness of at least about 1,000 and an average particle size of from about 1 micron up to a U.S. Sieve Series Number of about 50; and
at least one hygroscopic polymeric material, said hygroscopic polymeric material being a polyacrylamide capable of absorbing at least about 100 times its weight in water;
the pH of said composition being in the range of about 6.5 to about 8.5.

18. The composition of claim 17 wherein said composition further comprises a minor property-improving amount of at least one surfactant.

19. The composition of claim 17 wherein said composition further comprises a minor surface-active amount of at least one surfactant, said surfactant being an amide, imide or salt made by reaction of at least one fatty acid with at least one hydroxyl amine.

20. The composition of claim 17 wherein said composition further comprises a minor property-improving amount of at least one surfactant.

21. The composition of claim 17 wherein said abrasive is a mineral selected from the group consisting of topaz, aluminum oxide, silicon carbide, boron nitride and diamond.

22. The composition of claim 17 wherein said abrasive has an average particle size of about 1 to about 10 microns.

23. The composition of claim 17 wherein said abrasive has a Knoop scale hardness of at least about 2,000.

24. The composition of claim 17 wherein said abrasive is aluminum oxide with a Knoop scale hardness of at least about 1,500 and an average particle size in the range of about 1.2 to about 2.2 microns.

25. A process for removing scratches from a nonporous surface comprising:
applying the composition of claim 17 to said surface;
rubbing said surface with said composition until said scratches are removed or reduced to the desired degree; and
removing said composition from said surface.

* * * * *